(12) United States Patent
Rowse et al.

(10) Patent No.: US 11,596,099 B2
(45) Date of Patent: Mar. 7, 2023

(54) HAY RAKE TOOTH ASSEMBLY

(71) Applicant: Rowse Hydraulic Rakes Co., Inc., Burwell, NE (US)

(72) Inventors: Dannie Dean Rowse, Ord, NE (US); Rodney Dean Rowse, O'Neill, NE (US)

(73) Assignee: Rowse Hydraulic Rakes Co., Inc., Burwell, NE (US)

( * ) Notice: Subject to any disclaimer, the term of this patent is extended or adjusted under 35 U.S.C. 154(b) by 273 days.

(21) Appl. No.: 16/736,471

(22) Filed: Jan. 7, 2020

(65) Prior Publication Data

US 2020/0137949 A1    May 7, 2020

Related U.S. Application Data

(63) Continuation-in-part of application No. 14/254,281, filed on Apr. 16, 2014, now Pat. No. 10,624,268.

(60) Provisional application No. 61/812,813, filed on Apr. 17, 2013.

(51) Int. Cl.
*A01D 7/06* (2006.01)
*A01F 7/02* (2006.01)

(52) U.S. Cl.
CPC . *A01D 7/06* (2013.01); *A01F 7/02* (2013.01)

(58) Field of Classification Search
CPC ............ A01D 80/02; A01D 7/02; A01D 7/06
See application file for complete search history.

(56) References Cited

U.S. PATENT DOCUMENTS

| | | | | | |
|---|---|---|---|---|---|
| 2,597,485 | A | * | 5/1952 | Hillyer | A01D 34/535 172/834 |
| 2,909,889 | A | * | 10/1959 | Gustafson | A01D 80/02 56/400 |
| 2,989,835 | A | * | 6/1961 | Johnston | A01D 80/02 56/400 |
| 3,031,835 | A | * | 5/1962 | Gustafson | A01D 80/02 56/400 |
| 3,096,609 | A | * | 7/1963 | Garrett | A01D 80/02 56/400.01 |
| 3,102,377 | A | * | 9/1963 | Garrett | A01D 80/02 56/400.01 |
| 3,126,693 | A | * | 3/1964 | Renn | A01D 80/02 56/364 |
| 3,157,019 | A | * | 11/1964 | Brackbill | A01D 80/02 56/400 |
| 3,186,153 | A | * | 6/1965 | Breed | A01D 80/02 56/400 |
| 3,192,696 | A | * | 7/1965 | Hurry | A01D 80/02 56/400 |
| 3,226,922 | A | * | 1/1966 | Luther | A01D 80/00 56/400 |
| 3,253,393 | A | * | 5/1966 | Johnston | A01D 80/02 56/400 |
| 3,253,394 | A | * | 5/1966 | Johnston | A01D 80/02 172/543 |

(Continued)

*Primary Examiner* — Arpad F Kovacs
(74) *Attorney, Agent, or Firm* — Zarley Law Firm, P.L.C.

(57) ABSTRACT

A hay rake tooth assembly for use with a mounting clip on a hay rake wheel. The hay rake tooth assembly has a tine with a ball-shaped retaining member that is configured to permit a shaft of the tine to move along the length of the difference in diameter between the shaft and a tine opening of the mounting clip in which is the tine is assembled.

10 Claims, 9 Drawing Sheets

(56) References Cited

U.S. PATENT DOCUMENTS

| | | | | |
|---|---|---|---|---|
| 3,253,395 | A * | 5/1966 | Johnston | A01D 80/02 56/400 |
| 3,261,153 | A * | 7/1966 | Johnston | A01D 80/02 172/543 |
| 3,401,515 | A | 9/1968 | Fishbaugh | |
| 3,402,542 | A * | 9/1968 | Johnston | A01D 80/02 56/400 |
| 3,481,125 | A * | 12/1969 | Miller | A01D 80/02 56/400 |
| 3,531,927 | A * | 10/1970 | Wood | A01D 80/02 56/400 |
| 3,553,950 | A * | 1/1971 | Waser | A01D 80/02 56/400 |
| 3,561,206 | A * | 2/1971 | Fuller | A01D 80/02 56/400 |
| 3,597,910 | A * | 8/1971 | Stewart | A01D 80/02 56/400 |
| 3,664,107 | A | 5/1972 | Keller | |
| 3,698,172 | A * | 10/1972 | Johnston | A01D 80/02 56/400 |
| 3,834,140 | A | 9/1974 | Delfino | |
| 3,859,777 | A * | 1/1975 | Doering | E01H 1/106 56/364 |
| D237,527 | S * | 11/1975 | van der Lely | D15/29 |
| 3,921,376 | A * | 11/1975 | Hofer | A01D 61/00 56/400.21 |
| 3,959,955 | A * | 6/1976 | Smith | A01D 34/003 D15/17 |
| 4,189,907 | A * | 2/1980 | Erdman | A01D 89/002 172/713 |
| 4,473,994 | A * | 10/1984 | Hein | A01D 80/02 56/400 |
| 4,481,758 | A * | 11/1984 | Fishbaugh | A01D 80/02 56/400 |
| D456,424 | S | 4/2002 | Rowse et al. | |
| 7,540,139 | B2 | 6/2009 | Rowse et al. | |
| 10,412,892 | B2 | 9/2019 | Rowse et al. | |
| 10,674,668 | B2 * | 6/2020 | Schroeder | A01D 80/02 |
| D936,711 | S * | 11/2021 | Worden | D15/29 |
| 2014/0311117 | A1 | 10/2014 | Rowse et al. | |

* cited by examiner

HAY RAKE TOOTH ASSEMBLY

CROSS REFERENCE TO RELATED APPLICATION

This application is a continuation-in-part of U.S. application Ser. No. 14/254,281 filed Apr. 16, 2014, which claims the benefit of U.S. Provisional Application No. 61/812,813 filed Apr. 17, 2013, the contents of these applications are hereby incorporated by reference in their entirety.

BACKGROUND OF THE INVENTION

This invention is directed towards a hay rake tooth assembly. More specifically, and without limitation, this invention relates to an improved tine for a hay rake tooth assembly.

Both hay rake tooth assemblies and mounting clips for hay rake teeth assemblies are well known in the art. A conventional mounting clip has an elongated member with a central portion and two widened sections on each end of the elongated member. The central portion has legs or flanges that engage the sides of a wheel rim to prevent the clip from turning with respect to the rim of a hay rake wheel.

To provide sufficient strength to prevent turning during raking operations, conventional mounting clips are 6.5 inches long. This length provides a spacing between hay rake teeth assemblies of 5.25 inches where a wheel having a diameter of 60.59 inches has approximately 19 clips and 38 hay rake teeth assemblies. Under normal raking conditions, this design is acceptable. However, when used in short hay or shredded crops, an unacceptable amount of crop passes between the wider teeth and is left in the field. In heavy, wet crops, conventional rakes jump over the crop leaving hay because they lack sufficient raking power.

One advancement that has occurred is disclosed in U.S. Ser. No. 14/254,281 from which the present application claims priority. The inventive mounting clip disclosed therein allows for a greater number of mounting clips to be attached around the diameter of the rim of the hay rake wheel with greater strength due to the presence of flanges of the clips.

Despite this advancement, other deficiencies exist. In conventional assemblies, the tine extends through the central portion of the mounting clip and is held in place by a rubber molding and the hole in the mounting clip in which the tine passes through. In this arrangement, the hole weakens the structural integrity of rubber molding. Since the position of the tine is retained only by the molding, when the molding fatigues, or is stressed beyond its limitations, the molding breaks and the tine is released into the field where the tine can puncture an implement tire, be run through a field chopper, or interfere with production in some other way.

One advancement in the art is disclosed in U.S. Pat. No. 10,412,892, which is incorporated by reference herein in its entirety. The mounting clip is improved by having swedged or cupped portions positioned above the openings for the tine, which extend upwardly from the mounting clip. The tine in the advancement have an enlarged portion that is received within the swedged portions, whereas the smaller portion of the tine passes through the openings. In this way, the enlarged portions are retained in the mounting clip when assembled.

Despite these advances and others, problems still remain. More particularly, conventional hay rake tooth assemblies and their advancements use a tine that has a flat, triangular, or conical retaining member that is retained between the rim of the hay rake wheel and the mounting clip. In these arrangements, the shape of the tine results in the tine being rigidly held in place due to the inability of the tine to change positions as the shape inhibits movement leading to substantial wear and eventual breakage of tines. Therefore, it is a primary objective of the present invention to provide a hay rake tooth assembly that improves upon the art.

Another objective of the present invention is to provide a hay rake tooth assembly that is stronger and more resilient.

Another objective of the present invention is to provide a hay rake tooth assembly that better retains a tine under stress or fatigue.

These and other objectives, features, and advantages of the invention will become apparent from the specification and claims.

SUMMARY OF THE INVENTION

In general, the present invention relates to a hay rake tooth assembly for use with a mounting clip on a hay rake wheel. The hay rake tooth assembly has a tine with a ball-shaped retaining member that is configured to permit a shaft of the tine to move along the length of the difference in diameter between the shaft and a tine opening of the mounting clip in which the tine is assembled.

The ability of the tine for movement made possible by the retaining member reduces the wear on the tine and drastically reduces the likelihood of breakage. In some embodiments, the present invention is assembled with a mounting clip using a molding that further secures the tine and inhibits the tine from rotating during operation.

In some embodiments, the mounting clip includes an elongated channel having a first end, a central portion, and an elongated second section. Along the elongated section are at least two laterally widened sections that provide greater surface area for receiving the molding. At least one of the ends of the channel extend beyond one of the laterally widened sections.

DETAILED DESCRIPTION

Figure 1:
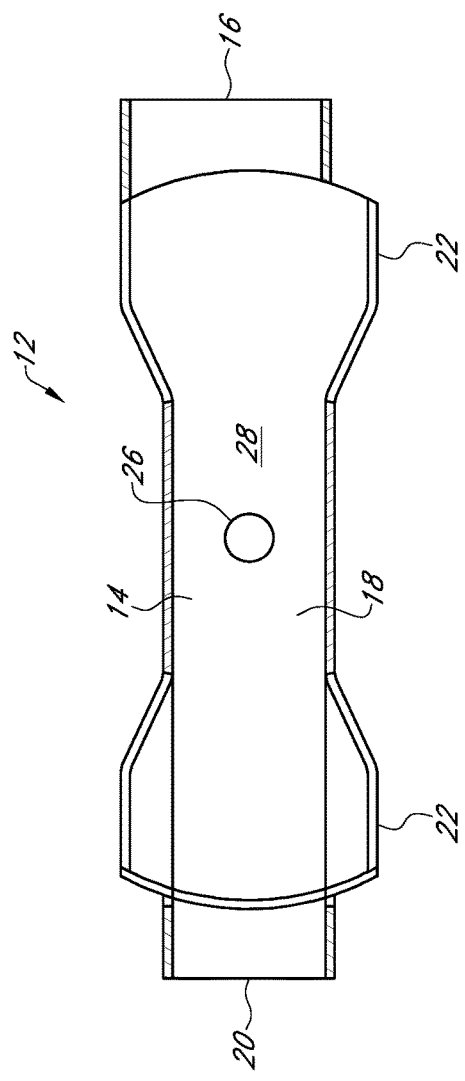
FIG. 1 is a bottom plan view of a prior art single mounting clip.
Figure 2:
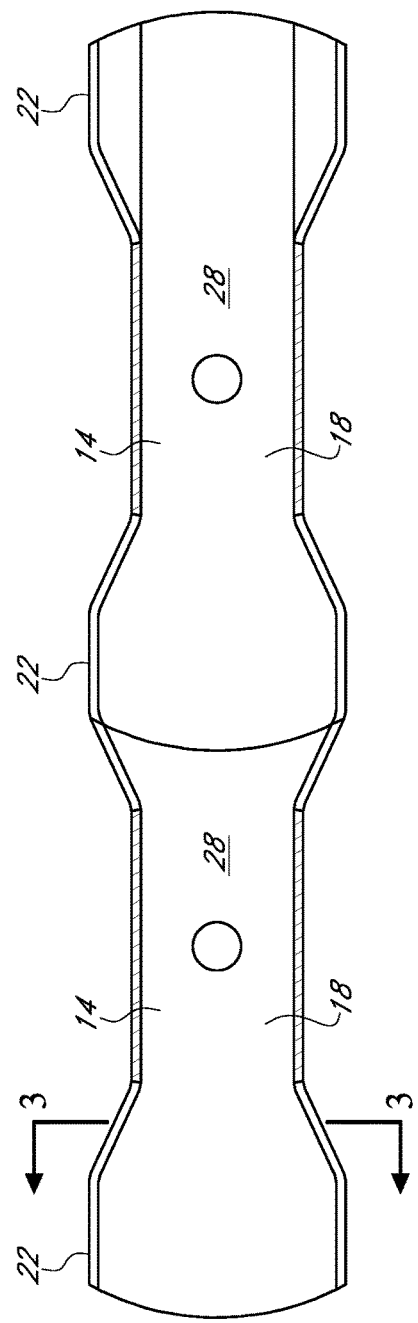
FIG. 2 is a bottom plan view of a mounting clip with more than one channel flange.
Figure 3:
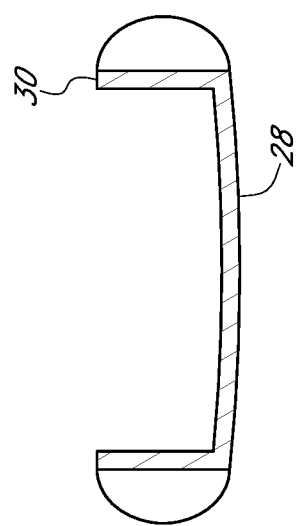
FIG. 3 is an end sectional view of a mounting clip.
Figure 4:
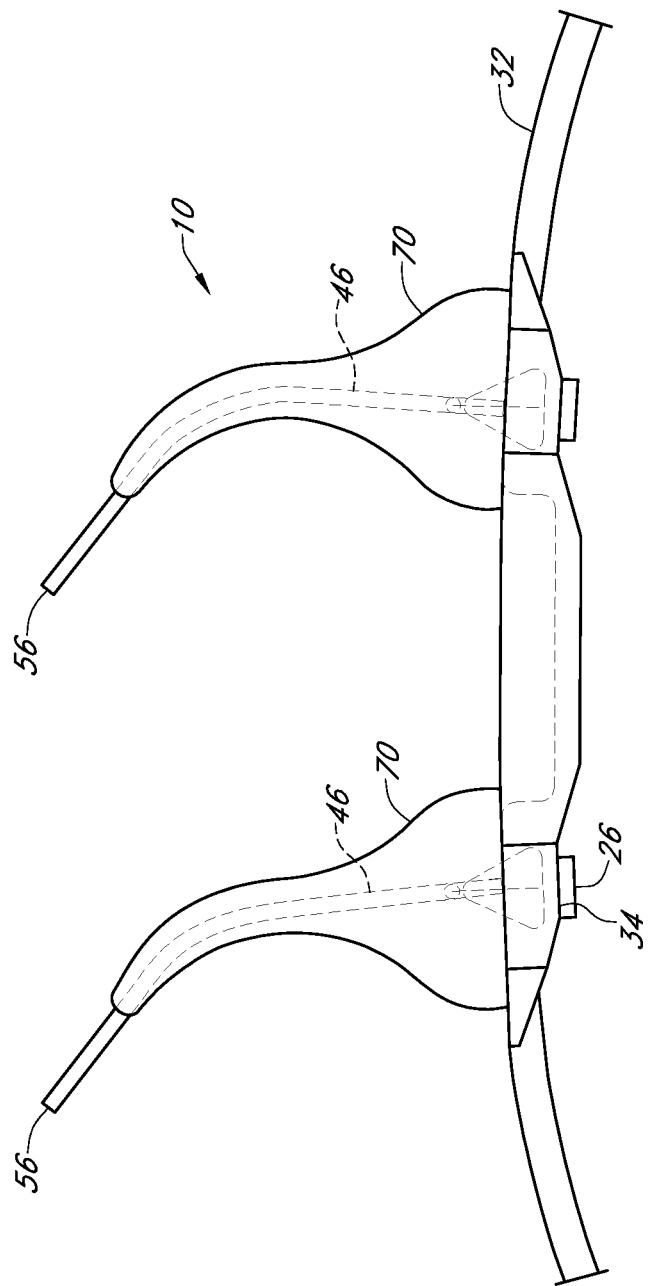
FIG. 4 is a side view of a plurality of hay rake tooth assemblies connected to a mounting clip.
Figure 5:
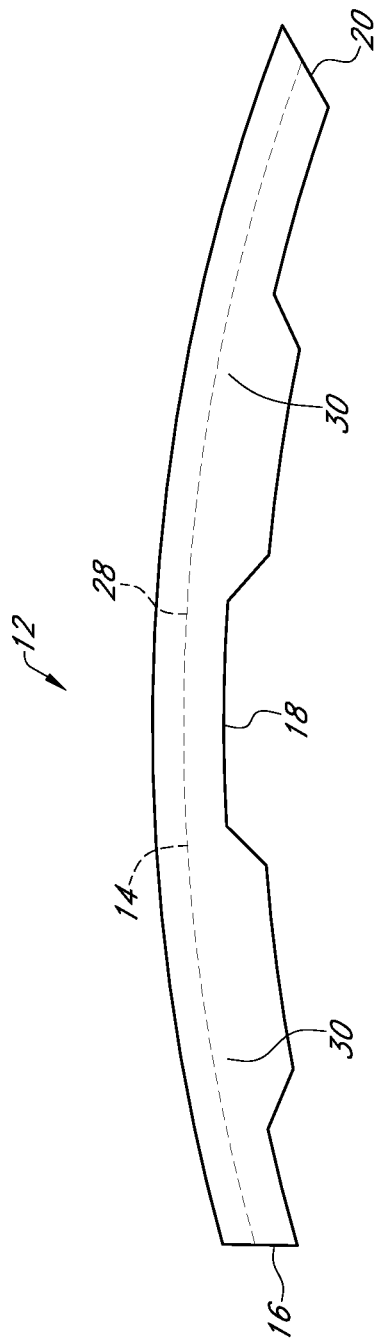
FIG. 5 is a side view of a mounting clip.
Figure 6:
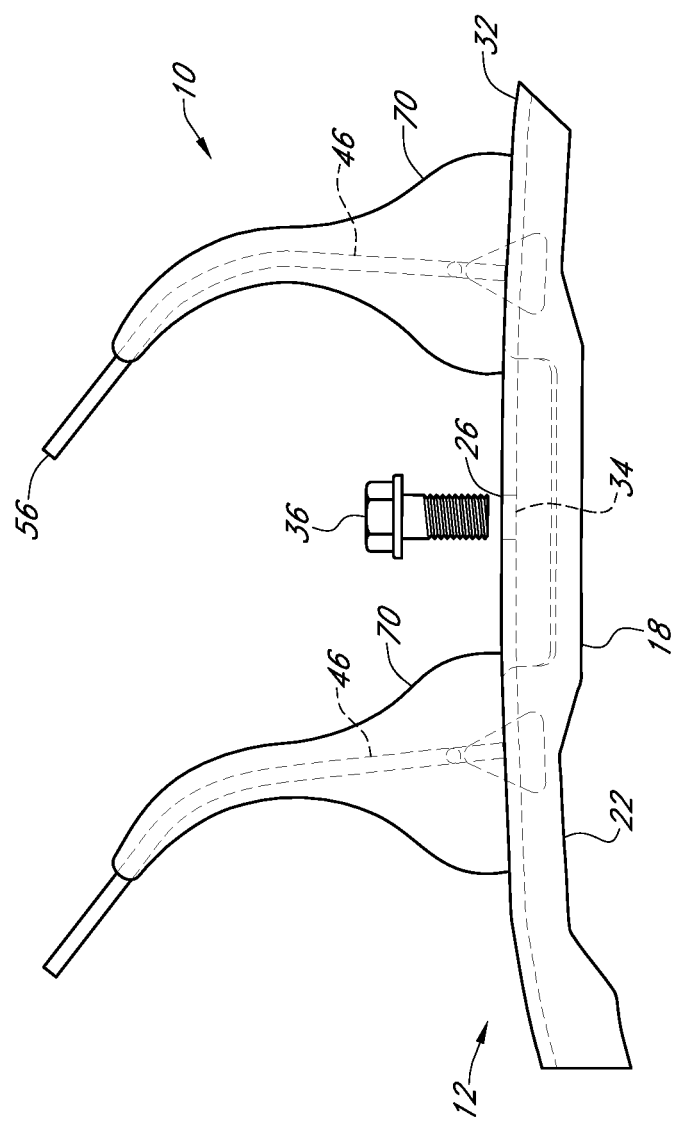
FIG. 6 is a side view of a plurality of hay rake tooth assemblies connected to a mounting clip.
Figure 7:
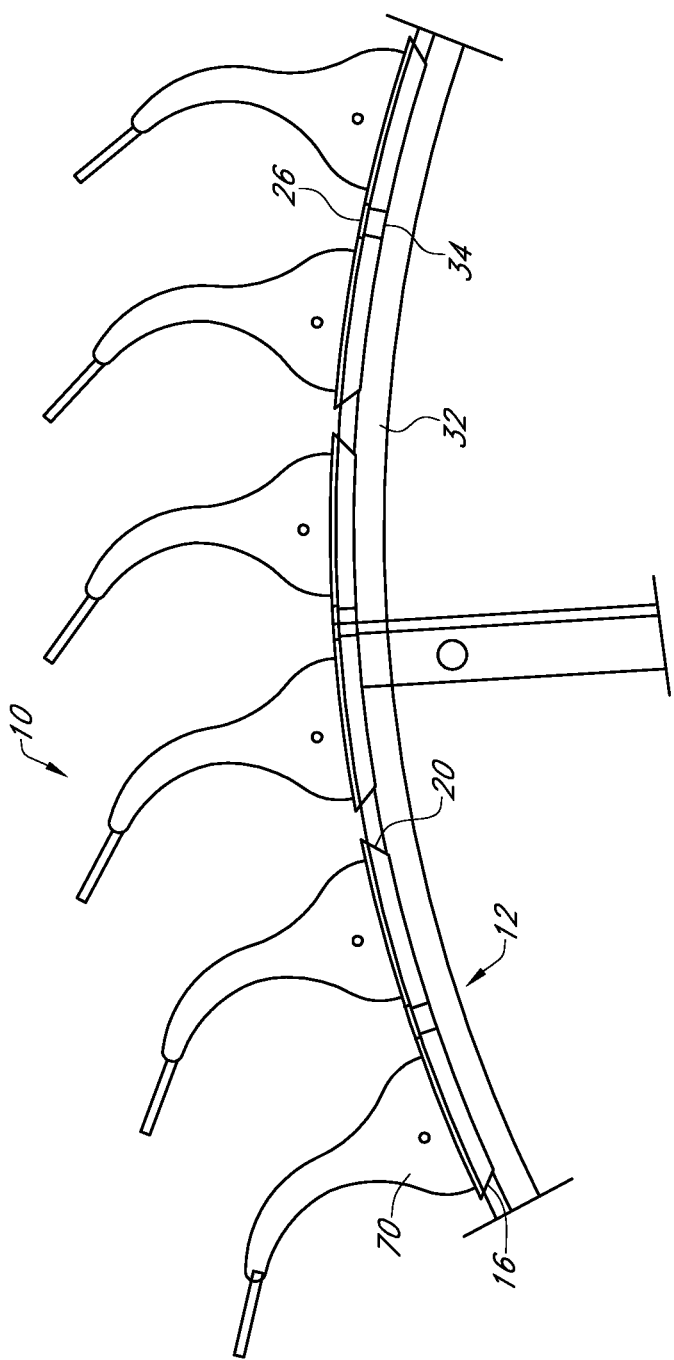
FIG. 7 is a side view of a plurality of hay rake tooth assemblies mounted to a hay rake with a plurality of mounting clips.
Figure 8:
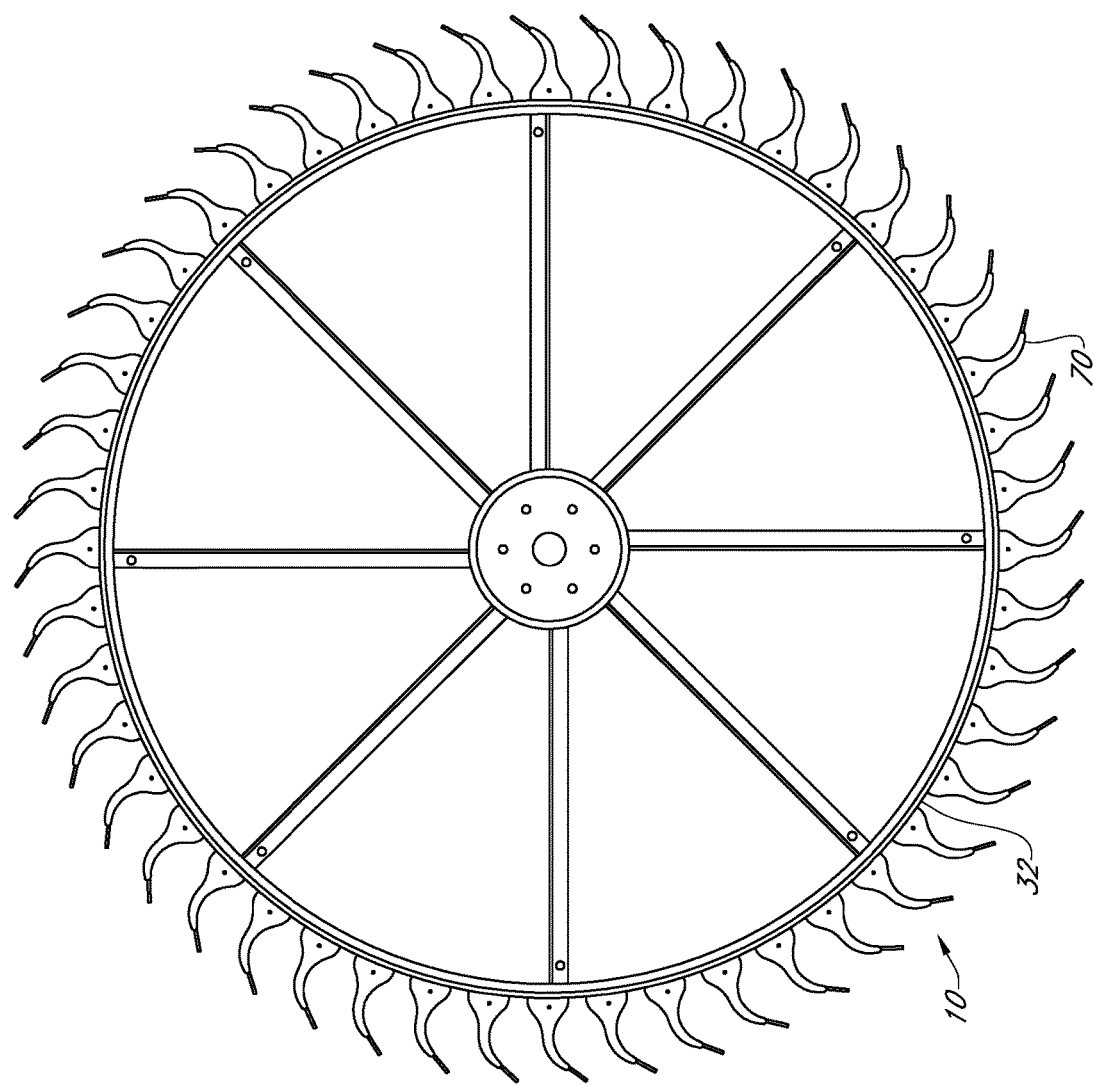
FIG. 8 is a side view of a plurality of hay rake tooth assemblies mounted to a hay rake with a plurality of mounting clips.
Figure 9:
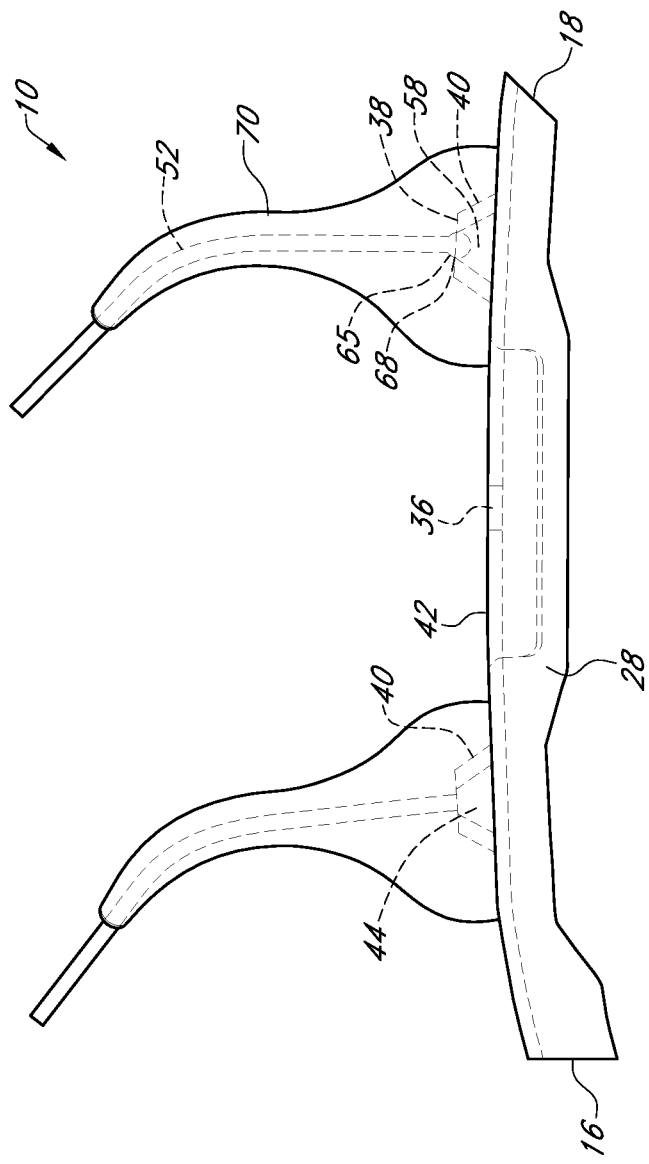
FIG. 9 is a side view of a plurality of hay rake tooth assemblies connected to mounting clip.

With reference to the figures, a hay rake tooth assembly 10 is shown for use with a mounting clip 12. The mounting clip 12 in some embodiments has an elongated channel 14 having a first end 16, a central portion 18, and a second end 20. The mounting clip 12 is laterally widened in two or more sections 22. The central portion 18 of the mounting clip 12 is positioned between the widened sections 22 and at least one of ends 16 and 20 extend beyond the widened sections 22. For example, in one arrangement, the length of the mounting clip 12 is 6.0 inches with one end 16 or 20 having a length of 0.5 inches. In one embodiment the central portion 18 extends the full length of the clip 12. In an alternative embodiment the clip 12 has multiple central portions 18 separated by a third, centrally located, widened section 22.

The mounting clip 12 has a connecting hole or opening 26 in a base plate 28 of the mounting clip 12 and legs or flanges 30 that extend radially inwardly from the base plate 28 and around the sides of a hay rake wheel rim 32 to maintain the mounting clip 12 in alignment with the hay rake wheel rim 32. The flanges 30 preferably are longer in the central portion 18 and at ends 16 and 20 to prevent the mounting clip 12 from turning with respect to the hay rake wheel rim 32. The hay rake wheel rim 32 also has a connecting hole or opening 34 that aligns with the connecting hole 26 of the mounting clip 12 to receive a fastener or bolt 36 therethrough to connect the mounting clip 12 with rim 32.

In another arrangement, the mounting clip 12 has the connecting hole 26 positioned substantially equidistance from the first end 16 and the second end 20. Positioned between the first end 16 and the connecting hole 26 and between the connecting hole 26 and the second end 20 are a pair of tine holes or openings 38. In some configurations, the pair of tine holes 38 have a swedged or cupped portion 40 that extends upwardly away from a top surface 42 of the base plate 28. Within the swedged portion 40 is a cavity 44.

Figure 10:
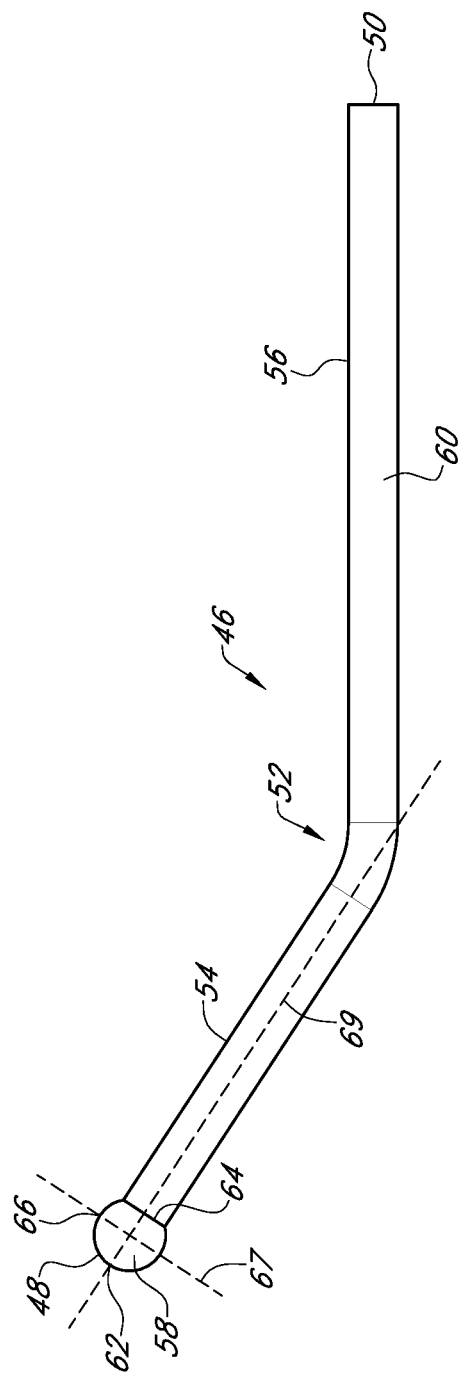
FIG. 10 is a side view of a tine of a hay rake tooth assembly.

One or more of the hay rake tooth assemblies 10 are connected to the mounting clip 12. The hay rake tooth assembly 10 has a tine 46 that extends from a first end 48 to a second end 50. Positioned between the first end 48 and the second end 50 is a bend or angled portion 52. Between the first end 48 and the bend 52 is a first section 54 and between the bend 52 and the second end 50 is a second section 56. As seen in the exemplary embodiment of FIG. 10, the first section 54 of tine 46 is approximately 2.5 inches in length and the second section 56 is approximately 4.5 inches in length. Together, the first section 54 and the second section 56 form an approximately 150° angle.

The tine 46 has a retaining member or base 58 and a shaft 60. The retaining member 58 of the present invention has a spherical or ball-like shape. In some embodiments, the retaining member 58 has a bottom 62, located at the first end 48, which has a flat profile. Due to the connection with the shaft 60, in some arrangements of the present invention, a top 64 of the retaining member 58 is not ball or spherical shape, but is formed in a monolithic structure of the tine 46—as seen in the exemplary embodiment of FIG. 10.

The tine 46, in some configurations, is received through one of the pair of tine holes 38. The retaining member 58 has a diameter at the largest width that is greater than the diameter of the pair of tine holes 38 and the shaft 60 has a smaller diameter than the diameter of the pair of tine holes 38. In this way, the retaining member 58 cannot pass entirely through the tine hole 38.

In some embodiments, the diameter of the retaining member 58 is such that a protruding portion 65 of the retaining member 58 extends through the diameter of the pair of tine holes 38, i.e., the protruding portion 65 of the retaining member 58 has a diameter smaller than the diameter of the tine hole 38 of the mounting clip 12 but larger than the diameter of the shaft 60. In one embodiment, the retaining member 58 has a midpoint 66 between the top 64 and the bottom 62. The midpoint 66 in some embodiments is along a plane 67 extending through the largest diameter of the retaining member 58 and perpendicularly to an axis 69 extending from the top 64 and bottom 62 of the retaining member 58. In some arrangements, the protruding portion 65 is approximately half way between the midpoint 66 and the top 64. In this way, the tine 44 can move along the length of the protruding portion 65 until the shaft 60 of the tine 44 engages an edge 68 of the pair of tine holes 38. In arrangements having the mounting clip 12 with the swedged portion 40, the retaining member 58, save for the protruding portion 65 in some embodiments, resides within the cavity 44.

When assembled, the first section 54 extends substantially vertically and perpendicularly to the substantially horizontal top surface 42 of the mounting clip 12. The second section 56 extends angularly upward and outward in relation to the first section 54 and the top surface 42 of the mounting clip 12. In some embodiments, the shaft 60 terminates at the second end 50 in a flat, circular profile.

Positioned around the shaft 60 is a molding 70 of the hay rake tooth assembly 10. In some embodiments, the molding 70 is rubber. In particular arrangements, the molding 70 extends from the top surface 42 of the mounting clip 12 to a point between the second end 50 and the bend 52. The widened sections 22 provide greater surface contact area with a radially inner end of the molding 70.

In operation, a plurality of mounting clips 12 are connected around the exterior of the hay rake wheel rim 32 by fasteners 36. The length of the mounting clip 12 allows for a greater number of mounting clips 12 to be positioned about the hay rake wheel rim 32, thereby increasing the number of hay rake tooth assemblies 10. During raking, the additional hay rake tooth assemblies 10 provide greater raking power. The flanges 30 of the mounting clips 12 avoid strength reduction by preventing the mounting clips 12 from turning and maintaining alignment of the mounting clips 12 on the hay rake wheel rim 32.

In embodiments with a spherical or ball-like retaining member 58, the tine 46 can move along the axial length of the protruding portion 65 in relation to and in the same direction as the second section 56 of the tine 46 is angled. The presence of the molding 70 prevents the tine 46 from rotating, such that the tine would be out of alignment with other hay rake tooth assemblies 10. In this way, the hay rake tooth assembly 10 is able to flex or give when encountering terrain without becoming misaligned and thereby improves the durability and reduces the wear on the hay rake tooth assembly 10. If the molding 70 were to fail, the retaining member 58 would prevent the tine 46 from becoming separated from the mounting clip 12.

Therefore, a hay rake tooth assembly 10 has been provided that is stronger and more resilient, better retains a tine 46 under stress or fatigue, and improves upon the art.

From the above discussion and accompanying figures and claims it will be appreciated that the hay rake tooth assembly 10 offers many advantages over the prior art. It will be appreciated further by those skilled in the art that various other modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included in the spirit and purview of this application.

What is claimed is:

1. A mounting clip, comprising:
an elongated channel that extends the length of the mounting clip and having a first end, a central portion, and a second end, wherein the elongated channel engages a wheel rim along the length of the elongated channel;
the elongated channel having a base and radially extending flanges, wherein the flanges are configured to extend opposing sides of the wheel rim;
at least two laterally widened sections along the elongated channel;
wherein at least one end of the elongated channel extends beyond one of the laterally widened sections;
a plurality of teeth assemblies having tines are secured to the mounting clip such that the tines extend radially outward around the circumference of the wheel rim and in the opposite direction of and in parallel-spaced alignment to the radially extending flanges;
the tines each extend between a first end and a second end;
the tine having a ball-shaped retaining member at the first end;
the tine having a shaft received through a tine hole in the mounting clip, wherein the shaft is configured with a diameter smaller than the diameter of the tine hole, and the retaining member having a diameter larger than the diameter of the tine hole in the mounting clip at the greatest diameter of the retaining member; and
a molding positioned around the shaft of the tine and extending upwardly from a top surface of the base of the elongated channel.

2. The clip of claim 1 wherein there are three laterally widened sections along the elongated channel.

3. The clip of claim 1 wherein the first and the second end extend beyond the at least two laterally widened sections.

4. The clip of claim 1 wherein the base has at least one opening and a pair of flanges that extend radially inwardly from the base.

5. The clip of claim 4 wherein the pair of flanges are longer at the first end, the second end, and the central portion.

6. The assembly of claim 1 further comprising a bend positioned between the first end and the second end.

7. The assembly of claim 1 further comprising a protruding portion of the retaining member configured to have a diameter smaller than the diameter of the tine hole of the mounting clip and larger than the diameter of the shaft.

8. The assembly of claim 7 wherein the protruding portion is configured to permit the shaft to move along the length of the difference in diameter between the shaft and the tine opening.

9. The assembly of claim 1 wherein the retaining member is configured to substantially reside within a cavity of the mounting clip having a swedged portion above a tine hole of the mounting clip.

10. The assembly of claim 1 wherein the tine is retained by the mounting clip through engagement of the retaining member against the mounting clip.

* * * * *